United States Patent
Chen (10) Patent No.: US 8,031,816 B2
(45) Date of Patent: Oct. 4, 2011

(54) METHOD AND APPARATUS FOR DETERMINING BOUNDARIES OF INFORMATION ELEMENTS

(75) Inventor: Kun-tso Chen, Chang-Hua Hsien (TW)

(73) Assignee: Mediatek Inc., Hsin-chu (TW)

( * ) Notice: Subject to any disclaimer, the term of this patent is extended or adjusted under 35 U.S.C. 154(b) by 1030 days.

(21) Appl. No.: 11/457,989

(22) Filed: Jul. 17, 2006

(65) Prior Publication Data

US 2008/0013604 A1    Jan. 17, 2008

(51) Int. Cl.
*H03D 1/00* (2006.01)

(52) U.S. Cl. ........ 375/343; 375/340; 375/316; 375/354; 370/320

(58) Field of Classification Search .................. 375/343, 375/340, 316, 354; 370/320
See application file for complete search history.

(56) References Cited

U.S. PATENT DOCUMENTS

| | | |
|---|---|---|
| 6,459,744 B1 | 10/2002 | Helard et al. |
| 6,480,150 B2 | 11/2002 | Falk et al. |
| 6,532,251 B1 | 3/2003 | King et al. |
| 6,654,926 B1 | 11/2003 | Raphaeli et al. |
| 6,754,292 B1 * | 6/2004 | Pulley et al. .................. 375/343 |
| 2002/0159542 A1 | 10/2002 | Kokkonen et al. |
| 2003/0193914 A1 * | 10/2003 | Lomp et al. .................... 370/335 |
| 2003/0227963 A1 | 12/2003 | Dafesh |
| 2006/0251154 A1 * | 11/2006 | Ettorre et al. ................. 375/148 |

FOREIGN PATENT DOCUMENTS

| | | |
|---|---|---|
| TW | I229981 | 3/2005 |
| TW | I230521 | 4/2005 |
| WO | 2004047327 A1 | 6/2004 |
| WO | 2005048521 | 5/2005 |

OTHER PUBLICATIONS

J.L. Massey, Optimum Frame Synchronization: IEEE Transactions on Communications, vol. COM-20, No. 2, Apr. 1972, pp. 115-119.
Mikko Kokkonen and Samuel Pietila, "A New Bill Synchronization Method for GPS Receiver" ION 2001.

* cited by examiner

*Primary Examiner* — David C. Payne
*Assistant Examiner* — Zewdu Kassa (57) ABSTRACT

A method for determining boundaries of information elements for a PRN code modulated signal is provided. The method of the present invention measures a symbol phase of the received signal and correlation values of different durations to determine the information element boundary. By the method of the present invention, the determination of the information element boundary can be more effective especially in the common dump receiver architecture, wherein a reference wave used in the correlation measurement of the receiver cannot match the received waveform exactly.

34 Claims, 12 Drawing Sheets

METHOD AND APPARATUS FOR DETERMINING BOUNDARIES OF INFORMATION ELEMENTS

TECHNICAL FIELD OF THE INVENTION

The present invention relates to signal processing in a communication system, more particularly, to bit/symbol synchronization of the received satellite signal in a GNSS receiver for determining boundaries of information elements (bit/symbol).

BACKGROUND OF THE INVENTION

A multi-channel GNSS (Global Navigation Satellite System) receiver has several channels to simultaneously track signals of a plurality of satellites, which can be of different navigation systems such as GPS, GLONASS, Galileo or SBAS (Satellite Based Augmentation System, which includes MSAS, EGNOS, WAAS and so on.) In general, each channel tracks a satellite signal and uses a matched filter (or a correlator) to improve the SNR (Signal to Noise Ratio) of the signal samples. The correlator multiplies the received signal samples with the locally generated replica signal samples and sums the products to generate signal samples of higher SNR. In order to maximize the SNR of the signals at the output of correlator, the local replica signal waveform generated by the receiver has to match the received signal waveform. A longer correlation time will yield signal samples of higher SNR. In addition, most GNSS systems use a signaling scheme to share the same radio navigation signal spectrum. For example, CDMA (Code Division Multiple Access) is used in GPS, Galileo and SBAS, where the transmitted data bits are modulated by a repeating PRN (Pseudo Random Noise) code sequence. The other systems use different signaling schemes to broadcast a plurality of satellite signals, such as FDMA (Frequency Division Multiple Access) which is used by GLONASS. In general, a receiver uses different local signal replica generators to correlate the received signal and thus find the targeted satellite signals.

After a satellite signal of rough frequency and delay time is acquired, the receiver has to track the satellite signal for obtaining more accurate frequency and delay time and then synchronize with the satellite. Meanwhile, the receiver has to continually decode the data bit stream transmitted by the satellite. In the signal acquisition/tracking/decoding process, the receiver processes the output of the correlator to estimate the signal parameters more precisely, such as the Doppler frequency, the code phase and the transmitted data bits. In one implementation, the correlator is implemented as a dedicated hardware to perform the high speed correlation operation. In another implementation, the correlator can be implemented as a software-based functional block. For example, the FFT (Fast Fourier Transform) based correlation technique can be used. The signal acquisition, tracking and decoding process require less computation burden compared with the correlation and thus can be implemented in another functional block, such as a multi channel shared hardware block, a CPU or a DSP.

Figure 1:
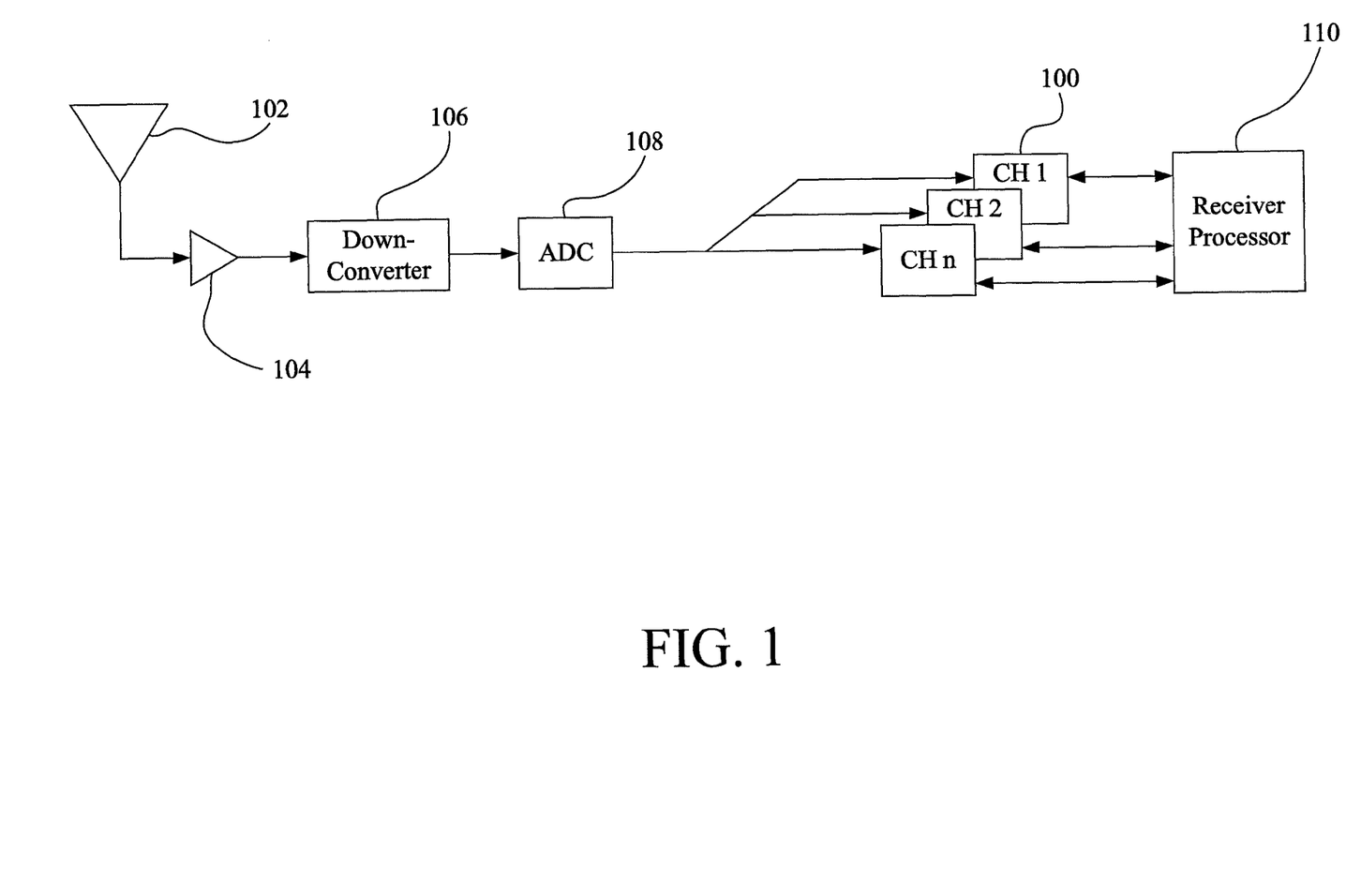
FIG. 1 is a block diagram showing a general digital GPS receiver.
Figure 2:
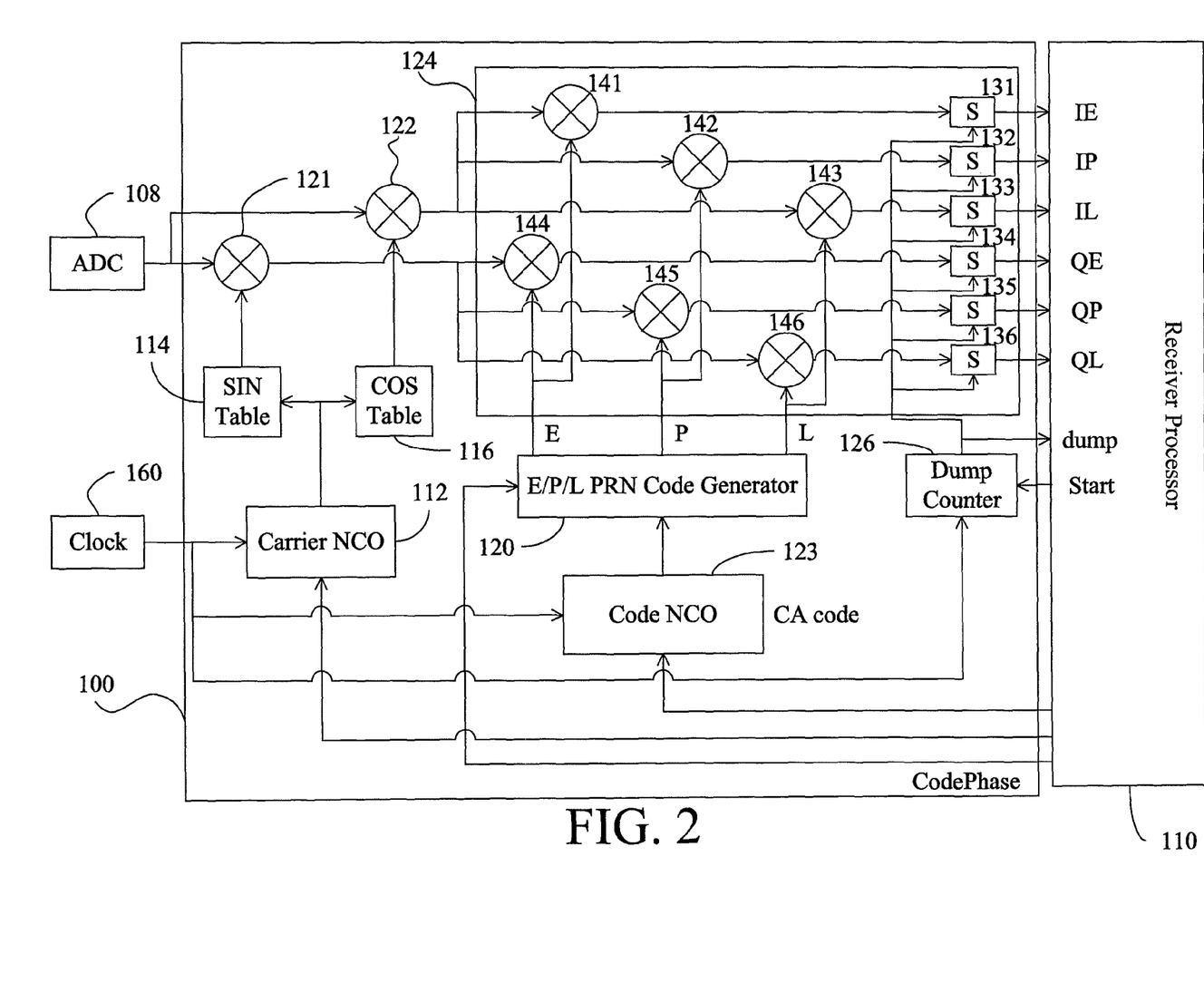
FIG. 2 is a block diagram showing a general digital receiver channel with a correlator.

FIG. 1 shows typical receiver architecture 10 of the CDMA system, such as GPS, Galileo and SBAS. In this architecture, several channel correlators $CH_1$, $CH_2$ ... $CH_n$, are used to perform signal correlation of multiple satellite signals respectively at the same time. The spread spectrum signal is received via an antenna 102 and amplified (by a preamplifer 104), down converted (by a down-converter 106) to the IF (Intermediate Frequency) stage. At this stage, the received signal is in analog form. Then, the received signal is converted into digital form by an ADC (analog-to-digital converter) 108. Also referring to FIG. 2, which shows a general architecture of a channel correlator $CH_n$. The digital signal from the ADC 108 (shown in FIG. 1 and FIG. 2) is down converted by means of a carrier NCO 112 (Numerically Controlled Oscillator), phase shifters 114, 116 and mixers 121, 122. The mixed result is a complex signal with in-phase and quadrature components. The in-phase and quadrature components are subjected to multiplication in multipliers 141~146 with reference PRN code generated by an E/P/L (Early/Prompt/Late) PRN code generator 120. The E/P/L PRN code generator 120 is controlled by a code NCO 123 to generate the despreaded signals IE, IP, IL and QE, QP, QL. These despreaded signals are respectively integrated in integration block 124. The integrated signals are led to a receiver processor 110. The beginning and end of the integration window of each integration block are controlled by a dump counter 126. For example, the PRN code used in the current GPS L1 civil signal is C/A code with period of one ms. The minimum integration length is usually limited by the PRN code period, one ms in this example. If the sampling frequency of the ADC is 5 MHz, there are 5000 samples in one ms. The receiver processor 110 uses a signal, Start, to control the start time point of the correlation. When the dump counter 126 receives Signal Start, it resets the accumulators 131~136 used in the correlation and starts counting from 0. When it counts to 4999, the correlation values in the accumulators 131~136 are latched and the receiver processor 110 is informed to process these values. The maximum of correlation duration is limited by the signal structure. For example, one data bit in the GPS L1 C/A code signal consists of twenty C/A code periods. Therefore, the phase of the received signal may be inverted every twenty ms due to the data bit modulation. In general, the maximum correlation duration is 10 ms if the information of data bit stream (including the bit timing and data bit values) is not available. The integration block 124 in FIG. 2 shows a form of coherent correlation, —of which the performance is limited by the data bit phase transition. This limitation can be removed by using incoherent correlation, which accumulates the squared coherent correlation values to extend the correlation duration. In one implementation, the receiver processor 110 uses the correlator output signals, IE, IP, IL, QE, QP and QL, to perform incoherent correlation. In another implementation, a hardware block is used to perform incoherent correlation and informs the receiver processor 110 to process the results. In any form of the correlation, the receiver processor 110 must control the start time of the correlation to maximize the output SNR.

In general, the receiver processor 110 adjusts the start time point of the correlation to match the data bit edge of the received signal in order to maximize the output SNR of the hardware correlator. When one of the correlators $CH_1$~$CH_n$ completes its correlation, the receiver processor 110 is interrupted to process the correlation result. The correlation duration for each satellite signal may be different. For example, we can use shorter correlation time to acquire a stronger signal rapidly. On the other hand, a weaker signal requires longer correlation time to improve the SNR at the correlator output. Furthermore, the times of arrival (TOA) of all the satellite signals are different. Therefore, the respective channel correlators complete their correlations at different time points. The receiver processor 110 will require an extremely high interrupt rate for processing each finished correlation instantly if it allows the start time points of correlations of different satellite signals to match the satellite's TOA. This is because the start time points and the end time points of correlations of different satellite signals are different. In order to simplify the design and reduce the interrupt rate of the receiver processor 110, the start time point of a correlation is usually limited. For example, the PRN code in the GPS L1 C/A signal and the SBAS signal is one ms in length. However, one data bit in L1 C/A signal comprises twenty C/A code periods and is twenty ms in length. One data symbol in the SBAS signal comprises two C/A code periods and is two ms in length. One of the proper designs of the receiver processor 110, which can track GPS L1 C/A and SBAS signals at the same time, is to use an interrupt rate of 1 KHz and common dump architecture. That is, the correlators are allowed to dump their correlation values to the receiver processor 110 at the predefined time points, which are one ms apart. Although the start time point of the local signal replica cannot match the TOA of the received signal exactly (the maximum absolute error is 0.5 ms), it is easy to design and control the receiver.

As mentioned previously, the integration and dump operation of the correlator is commonly controlled by a receiver processor 110 for all or several channels, that is, the beginning and end of the integration window (correlation window) are limited to the predefined time points. The integration window may not match the waveform of the incoming signal and may generate a maximum of mismatch error equal to 0.5 ms. This is not so bad for a GPS L1 C/A signal, for which an information element (i.e. a date bit) comprises twenty ms. However, for a SBAS signal (each data symbol comprising 2 ms), this is a serious problem.

SUMMARY OF THE INVENTION

The present invention is to provide a method for determining information element boundary of a signal, the signal having a plurality of information elements, each information element consisting of a group of codes, said method comprising steps of: obtaining a symbol phase of the signal; calculating energies of the signal over a predetermined duration for a plurality of a first group of time units and dumping the energies into a first energy value; calculating energies of the signal over the predetermined duration for the plurality of a second group of time units and dumping the energies into a second energy value; comparing the first and second energy values; and determining which of the first and second groups of time units the information element boundary is in according to the comparing result of the first and second energy values and the symbol phase.

The method of the present invention uses correlation values of different durations to determine the information element boundary for different situations. In addition, the estimated code phase of the signal is used to facilitate the determination of the information element boundary. By the method of the present invention, the determination of the information element boundary can be more effective with larger detection probability and smaller false alarm rate even in the dynamic situation.

In accordance with the present invention, the method determines if the symbol phase is within an ambiguity range, and selects a proper approach based on the result to determine the information element boundary. Usually, a symbol energy approach and code energy approach, which are discussed later, are selectively used in determination of the information element boundary.

The present invention also provides a synchronizer for determining information element boundary of a signal, the signal having a plurality of information elements, each information element consisting of a group of codes, said synchronizer comprising: a first register accumulating correlations of the signal over a first duration for a plurality of a first group of time units as a first energy value; a second register accumulating correlations of the signal over the first duration for the plurality of a second group of time units to as a second energy value; and a detector comparing the first and second energy values to determine which of the first and second groups of time units the information element boundary is in according to the comparing result of the first and second energy values and a symbol phase of the signal. The synchronizer of the present invention, determines the information element boundary by using correlations of different durations for various states. The selection among the different correlations is determined by considering the symbol phase.

BRIEF DESCRIPTION OF THE DRAWINGS

The present invention will be further described in detail in conjunction with the accompanying drawings, wherein.

DETAILED DESCRIPTION OF THE INVENTION

Figure 3:
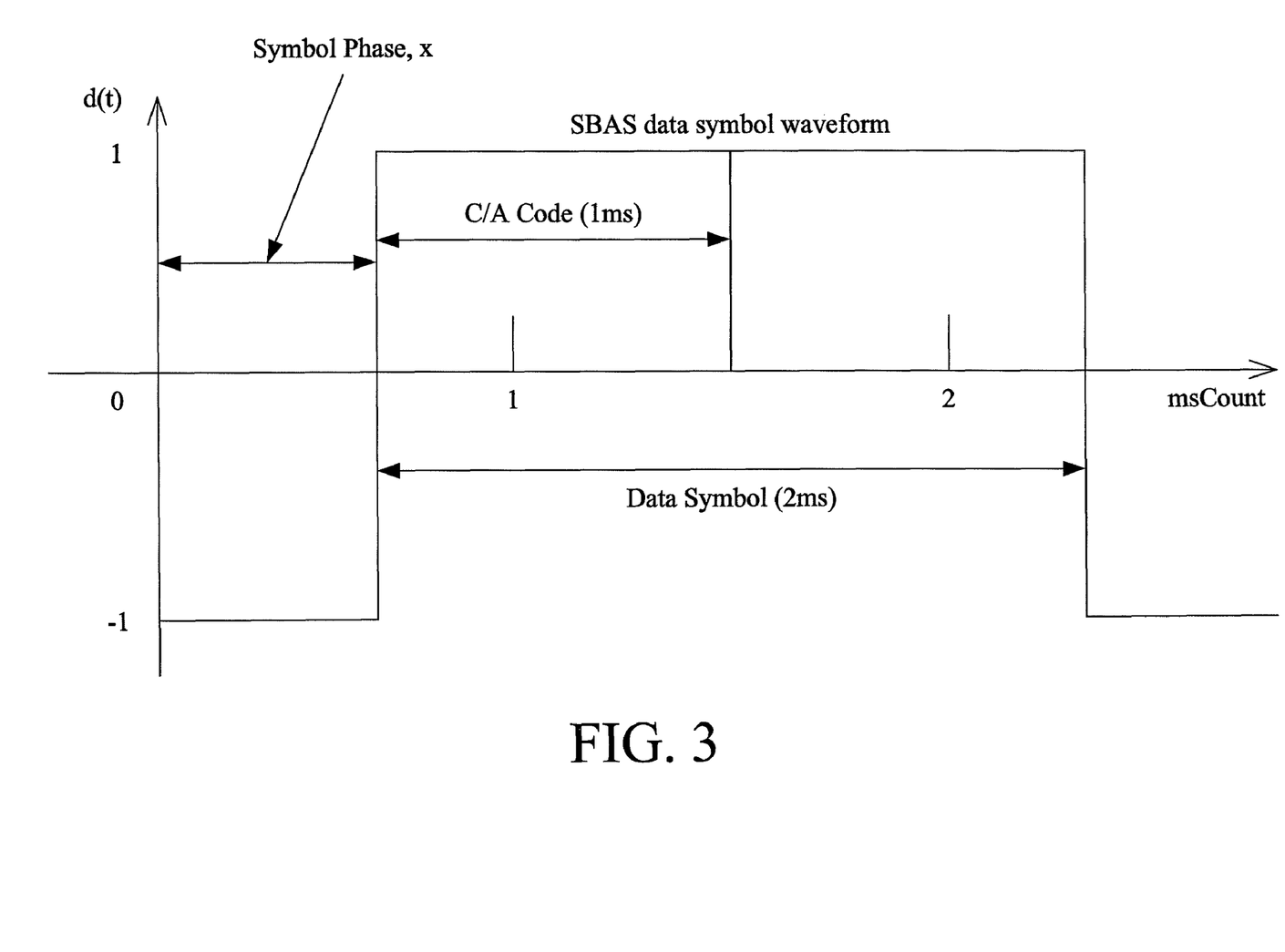
FIG. 3 shows the format of a SBAS signal, where the symbol phase of the received SBAS signal is defined with respect to a local ms count epoch.

For a spread spectrum signal, when the number of repeating PRN code periods per information element of the signal is small, it is difficult to determine the boundary of the information element under the common dump architecture as discussed previously. For a SBAS signal, one data symbol comprises only two ms, that is, two C/A code periods. An example of the SBAS signal is shown in FIG. 3, in which only the symbol boundaries and code boundaries are shown. The receiver can start correlation at the predetermined common dump time points, which are controlled by a count, msCount. The leading edge of the received SBAS symbol may not match the closest dump time point, from which the correlation window begins. The symbol phase x of a SBAS symbol with respect to the closest dump time point is defined as shown in FIG. 3. If the receiver starts a two ms correlation at msCount 0, then the correlation is completed and dumped at msCount 2. The completed correlation result then outputs to the receiver 110. If the symbol phase is equal to x ms ($0 \leq x < 1$) and one symbol phase transition occurs between msCount 0 and 1, the normalized correlation values is equal to 2−2x.

Before the receiver processes to decode the received data symbols, firstly, it must synchronize the symbol edge. Define an unknown variable s to indicate the position of the data symbol leading edge as follows $$s = \begin{cases} 1, & \text{if the symbol edges are behind the even numbered ms counts} \\ 0, & \text{if the symbol edges are behind the odd numbered ms counts} \end{cases} \quad (1)$$

Figure 4:
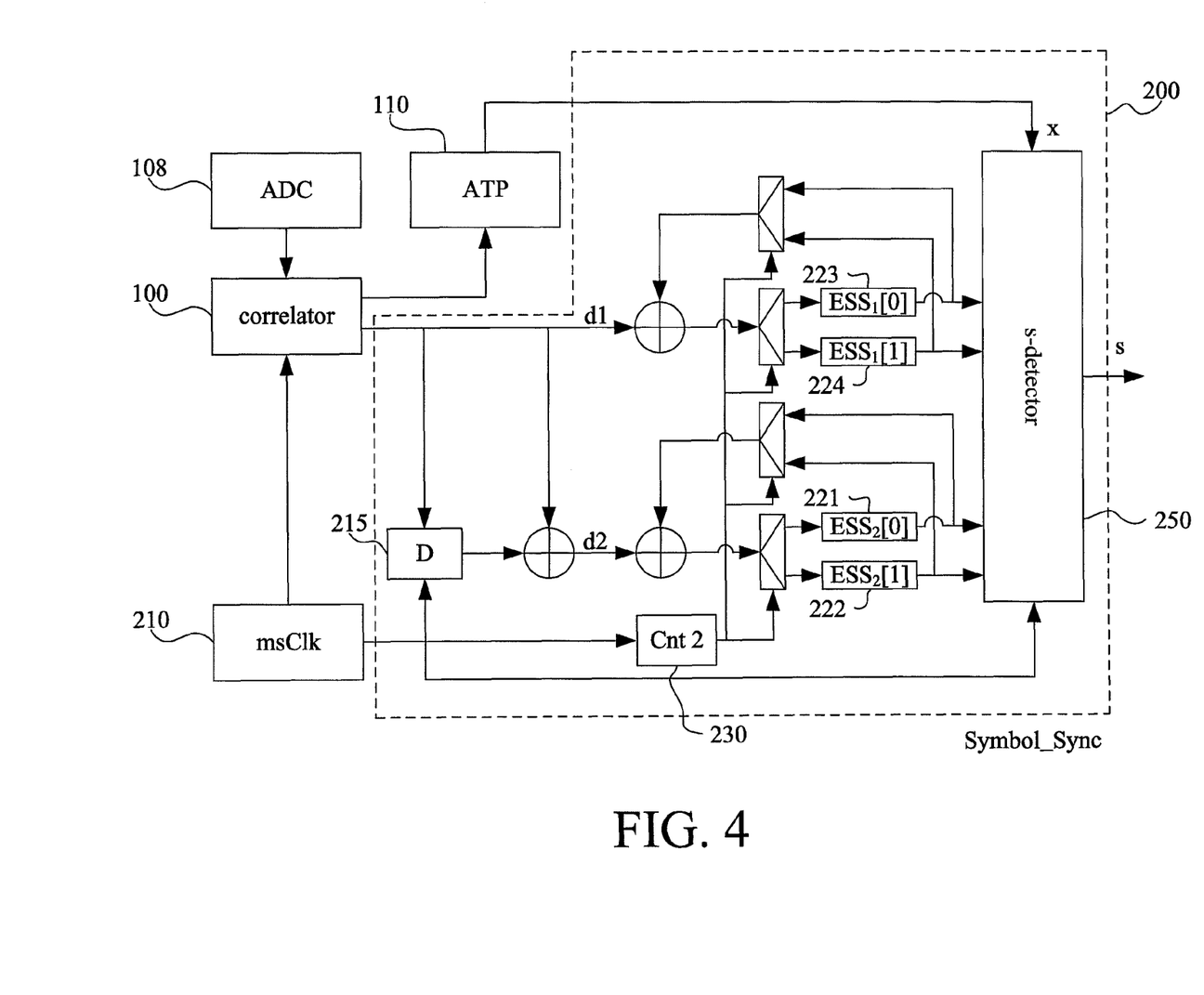
FIG. 4 is a block diagram showing a symbol synchronizer of an embodiment in accordance with the present invention, which accumulates the correlator outputs and then uses an estimated code phase to determine a symbol leading edge position.

FIG. 4 is a block diagram showing a symbol synchronizer 200 according to one embodiment of the present invention. As shown in FIG. 4, the symbol synchronizer 200 must determine s based on the correlator outputs. An approach uses an integration window of one symbol duration, two ms in SBAS, to synchronize the symbol phase, as discussed below. Define the random variable, $SS_2[0]$ (or $SS_2[1]$), as the absolute value of the two ms correlator outputs at the even (or odd) numbered ms counts. For example, assume s=1 and a two ms correlation starts at msCount 0, it will dump the result, |2−2x|, at msCount 2, which implies that $SS_2[0]=|2−2x|$. If the two ms correlation starts at msCount 1, the correlator will dump the result, |2x|, at msCount 3, which implies that $SS_2[1]=|2x|$. It is obvious that the correlator output depends on s, symbol phase transition and the start time point of the two ms correlation window, as shown in Table 1.

TABLE 1

The absolute value of the 2 ms correlation for different conditions.

| s | 1 | | 0 | |
|---|---|---|---|---|
| Phase Transition | yes | no | yes | no |
| $SS_2[0]$ | 2 − 2x | 2 | 2x | 2 |
| $E\{SS_2[0]\}$ | 2 − x | | 1 + x | |
| $SS_2[1]$ | 2x | 2 | 2 − 2x | 2 |
| $E\{SS_2[1]\}$ | 1 + x | | 2 − x | |

Therefore, we can measure $SS_2[0]$ and $SS_2[1]$ to determine s. Assume that the phase transition probability is one half, then the mean of $SS_2[0]$ and $SS_2[1]$ can be evaluated as follows, $$E\{SS_2[0]\} = \begin{cases} \frac{(2-2x)+2}{2} = 2-x, & \text{if } s=1 \\ \frac{2x+2}{2} = 1+x, & \text{if } s=0 \end{cases} \quad (2)$$

$$E\{SS_2[1]\} = \begin{cases} \frac{2x+2}{2} = 1+x, & \text{if } s=1 \\ \frac{(2-2x)+2}{2} = 2-x, & \text{if } s=0 \end{cases}$$

which can be used to determine s. However, the performance of this algorithm depends on the symbol phase x and fails when the difference between the mean of $SS_2[0]$ and $SS_2[1]$ is small. In particular, $E\{SS_2[0]\}$ is equal to $E\{SS_2[1]\}$ when x is equal to 0.5. It is noted that noise is not taken into account in the above computation. It is more difficult to determine s when the signal is corrupted by the noise. The present invention provides a method which can determine more effectively the boundary of the information element of a signal in the common dump architecture or improve the symbol synchronization performance in the general architecture. After s is determined, the receiver can utilize the known symbol phase x to determine the best beginning of correlation for reducing match errors in the common dump architecture.

The concepts and implementations of the present invention will be described now. With reference to FIG. 3, the SBAS signal is also used herein as an example. One data symbol of the SBAS signal comprises two C/A code periods. Before the receiver can determine the symbol leading edge position of the received signal, it must synchronize the PRN code phase first as is done in the acquisition/tracking process. It is obvious that the symbol phase, x, is equivalent to the code phase. In addition, the code tracking loop will estimate the code phase continually. Therefore, we can use the code phase to aid the symbol synchronization.

We define the two ms correlation values as the symbol energies. There are two kinds of symbol energy as shown in Table 1, $SS_2[0]$ and $SS_2[1]$, which depend on s and symbol phase transition. In the same manner, we can define the one ms correlation values as the code energies. That is, we define the random variable $SS_1[0]$ (or $SS_1[1]$) as the absolute value of the one ms correlator outputs at the even (or odd) numbered ms counts. The random variables $SS_1[0]$ and $SS_1[1]$ depend on s and symbol phase transition as shown in Table 2.

TABLE 2

The absolute value of one ms correlation for different conditions.

| | s | | | |
|---|---|---|---|---|
| | 1 | | 0 | |
| Phase Transition | yes | no | yes | no |
| $SS_1[0]$ | 1 | 1 | |1 − 2x| | 1 |
| $E\{SS_1[0]\}$ | 1 | | (1 + |1 − 2x|)/2 | |
| $SS_1[1]$ | |1 − 2x| | 1 | 1 | 1 |
| $E\{SS_1[1]\}$ | (1 + |1 − 2x|)/2 | | 1 | |

We can use the measured symbol and code energies and the code phase to synchronize symbol phase, i.e., to determine the unknown variable s by the symbol synchronizer 200 of FIG. 4. The symbol synchronizer 200 in FIG. 4 can be implemented as a hardware block, a software function routine, or a mixed form of hardware and software block. The SBAS symbol synchronizer 200 needs one ms correlation, which is computed by the correlator 100 in FIG. 4. The architecture of the correlator 100 is shown in FIG. 2. The acquisition and tracking processor, ATP, (receiver processor) 110, will estimate the code phase and carrier frequency of the received SBAS signal. For example, an early-minus-late code tracking loop may be used to estimate the code phase and a Costas PLL tracking loop may be used to estimate the carrier frequency. The estimated code phase, x, is used to facilitate the symbol synchronization. Assume that the early-minus-late code tracking loop is converged so that the IP and QP signals from the correlator output comprise the signal components. If the carrier tracking loop locks the carrier phase, we can use the in-phase component, IP, to perform symbol synchronization. Otherwise, we can use the square root of $(IP^{\Delta 2}+QP^{\Delta 2})$ to represent the C/A code despreaded and Doppler removed SBAS signal. In the following discussion, we use IP signal component for simplicity of the presentation. A clock source 210, which provide the clock msClk, is used to generate one ms interrupt signal. The correlator output is denoted by d1, which is computed every ms. In addition, two consecutive one ms correlation outputs are accumulated to form d2 as shown in FIG. 4. Four registers 221, 222, 223 and 224, are used to store the measured code and symbol energies $ESS_2[0]$, $ESS_2[1]$, $ESS_1[0]$ and $ESS_1[1]$. A counter, Cnt2 230, which is triggered by the clock msClk and outputs 0 or 1 every ms, is used to choose which code and symbol energy registers to be updated every ms. For example, Cnt2 230 outputs 0 at msCount 0 and chooses $ESS_2[0]$ and $ESS_1[0]$ to accumulate the correlator outputs, d2 and d1, respectively. At msCount 1, Cnt2 230 outputs 1 and chooses registers 222 and 224 ($ESS_2[1]$ and $ESS_1[1]$) to accumulate the correlator outputs, d2 and d1, respectively. Assume the code phase, x, is not changed during the accumulation and the symbol phase transition probability is one half, the values of $ESS_2[0]$, $ESS_2[1]$, $ESS_1[0]$ and $ESS_1[1]$ can be evaluated as shown in Table 1 and Table 2 after sufficient accumulations of correlation values (i.e a steady state is achieved). Then an s-detector 250 can use the accumulated $ESS_2[0]$, $ESS_2[1]$, $ESS_1[0]$, $ESS_1[1]$ and x to determine the unknown variable s.

In one implementation of the s-detector 250, we can use $ESS_2[0]$, $ESS_2[1]$ and x to determine s according to Table 1. At the steady state, the mean of the accumulated symbol energies should be:

$$ESS_2[0] = \begin{cases} 2-x, & \text{if } s=1 \\ 1+x, & \text{if } s=0 \end{cases} \quad (3)$$

$$ESS_2[1] = \begin{cases} 2-x, & \text{if } s=0 \\ 1+x, & \text{if } s=1 \end{cases} \quad (4)$$

Define the symbol energy difference as:

$$A \equiv ESS_2[0] - ESS_2[1] = \begin{cases} 1-2x \equiv A_1, & \text{if } s=1 \\ -1+2x \equiv A_0, & \text{if } s=0 \end{cases} \quad (5)$$

which can be used to determine s as follows:

$$s = \begin{cases} 1, & \text{if } (A>0 \text{ and } x<0.5) \text{ or } (A \leq 0 \text{ and } x \geq 0.5) \\ 0, & \text{otherwise} \end{cases} \quad (6)$$

Figure 5:
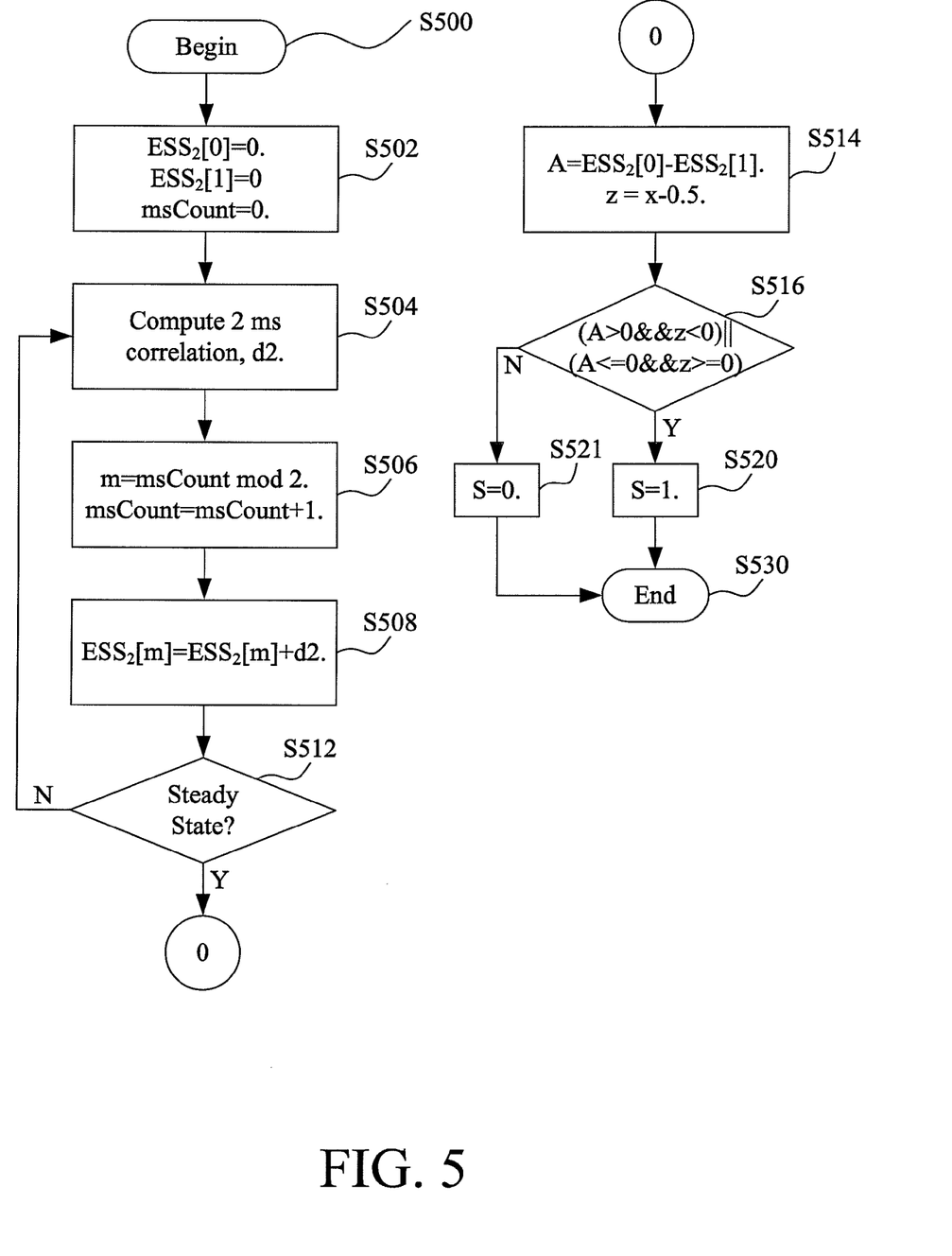
FIG. 5 is a flow chart of a method for determining information element boundary in accordance with a first embodiment of the present invention, in which symbol energy difference is used to determine the position of the symbol edge.

FIG. 5 is a flow chart showing a method for determining boundary of information element (symbol edge) in accordance with a first embodiment of the present invention. The method is implemented in the symbol synchronizer 200. In addition, this method uses symbol energy difference to determine the position of the symbol edge. The process of this method starts in step S500. The two accumulated symbol energies are initialized (step S502). That is, at msCount=0, $ESS_2[0]=0$ and $ESS_2[1]=0$. In step S504, the 2 ms correlation (correlator output) d2 is calculated by using I and Q components of the signal. In the symbol synchronizer 200, the 1 ms correlation d1 is calculated, and d2 can be obtained by using d1 and delay (obtained by a delay block 215 of FIG. 4) of d1. In steps S506 and S508, the count msCount is updated and the correlation d2 is added to the accumulated symbol energies $ESS_2[0]$ and $ESS_2[1]$ in turn. In step S512, it is checked if a steady state is achieved. That is, it is determined whether the accumulated symbol energies have been accumulated with sufficient correlator outputs. If so, the process enters symbol edge determination stage. In step S514, the symbol difference A between $ESS_2[0]$ and $ESS_2[0]$ is calculated. In addition, the difference z between the symbol phase x and 0.5 is calculated. As described above, the symbol phase x is known. Then, according to the equation (6), the symbol energy difference A and the symbol phase deviation z are checked to determine the value of s (step S516). If A>0 and z<0, then s is determined as 1 by the s-detector 250 (step S520). If $A \leq 0$ and $z \geq 0$, then s is also determined as 1 (S520). Otherwise, s is determined to be 0 (S521). The process ends in step S530.

In the above embodiment, the s-detector 250 uses symbol energies to determine s. However, the s-detector 250 can also use the code energies to determine as follows. At the steady state, the mean of the accumulated code energies should be:

$$ESS_1[0] = \begin{cases} 1, & \text{if } s=1 \\ \dfrac{1+|1-2x|}{2}, & \text{if } s=0 \end{cases} \quad (7)$$

$$ESS_1[1] = \begin{cases} 1, & \text{if } s=0 \\ \dfrac{1+|1-2x|}{2}, & \text{if } s=1 \end{cases} \quad (8)$$

Define the code energy difference $$B \equiv ESS_1[0] - ESS_1[1] = \begin{cases} \dfrac{1+|1-2x|}{2} \equiv B_1, & \text{if } s=1 \\ \dfrac{-1+|1-2x|}{2} \equiv B_0, & \text{if } s=0 \end{cases} \quad (9)$$

which implies that $$s = \begin{cases} 1, & \text{if } B>0 \\ 0, & \text{if } B \leq 0 \end{cases} \quad (10)$$

Figure 6:
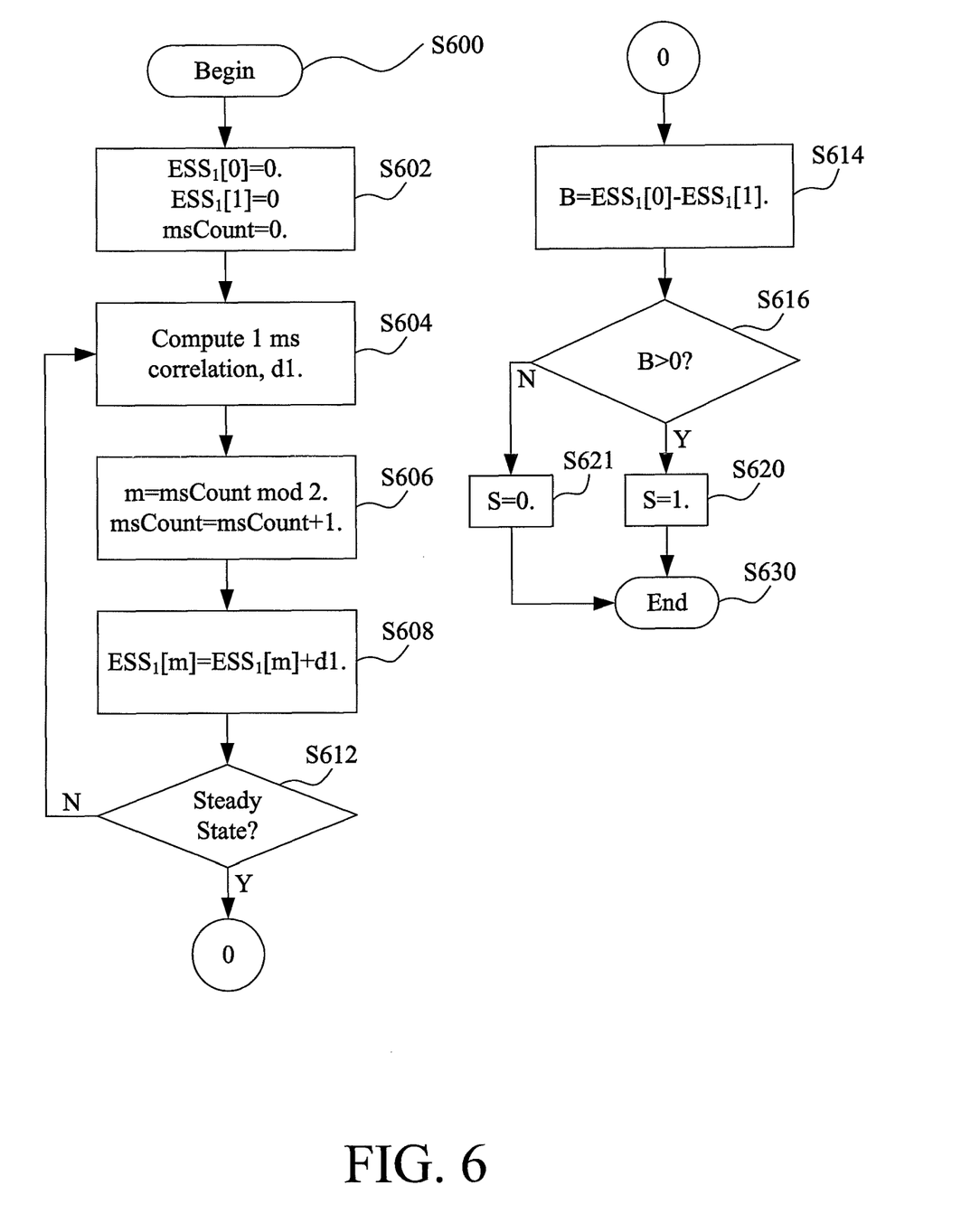
FIG. 6 is a flow chart of a method for determining information element boundary in accordance with a second embodiment of the present invention, in which code energy difference is used to determine the position of the symbol edge.

FIG. 6 is a flow chart showing a method implemented in the symbol synchronizer 200 in accordance with a second embodiment of the present invention, which uses code energy difference to determine the position of the symbol edge. The process starts in step S600. The two accumulated symbol energies are initialized (step S602). That is, at msCount=0, $ESS_1[0]=0$ and $ESS_1[1]=0$. In step S604, the 1 ms correlation d1 is calculated. In steps S606 and S608, the count msCount is updated and the 1 ms correlation d1 is added to the accumulated code energies $ESS_1[0]$ and $ESS_1[1]$ in turn. In step S612, it is checked if a steady state is achieved. That is, it is determined whether the accumulated code energies have been accumulated with sufficient correlations. If so, the process enters symbol edge determination stage. In step S614, the code energy difference B between $ESS_1[0]$ and $ESS_1[0]$ is calculated. Then, according to the equation (10), the code energy difference B is checked to determine the value of s (step S616). If B>0, then s is determined as 1 (step S620). Otherwise, s is determined to be 0 (S621). The process ends in step S630.

Figure 7:
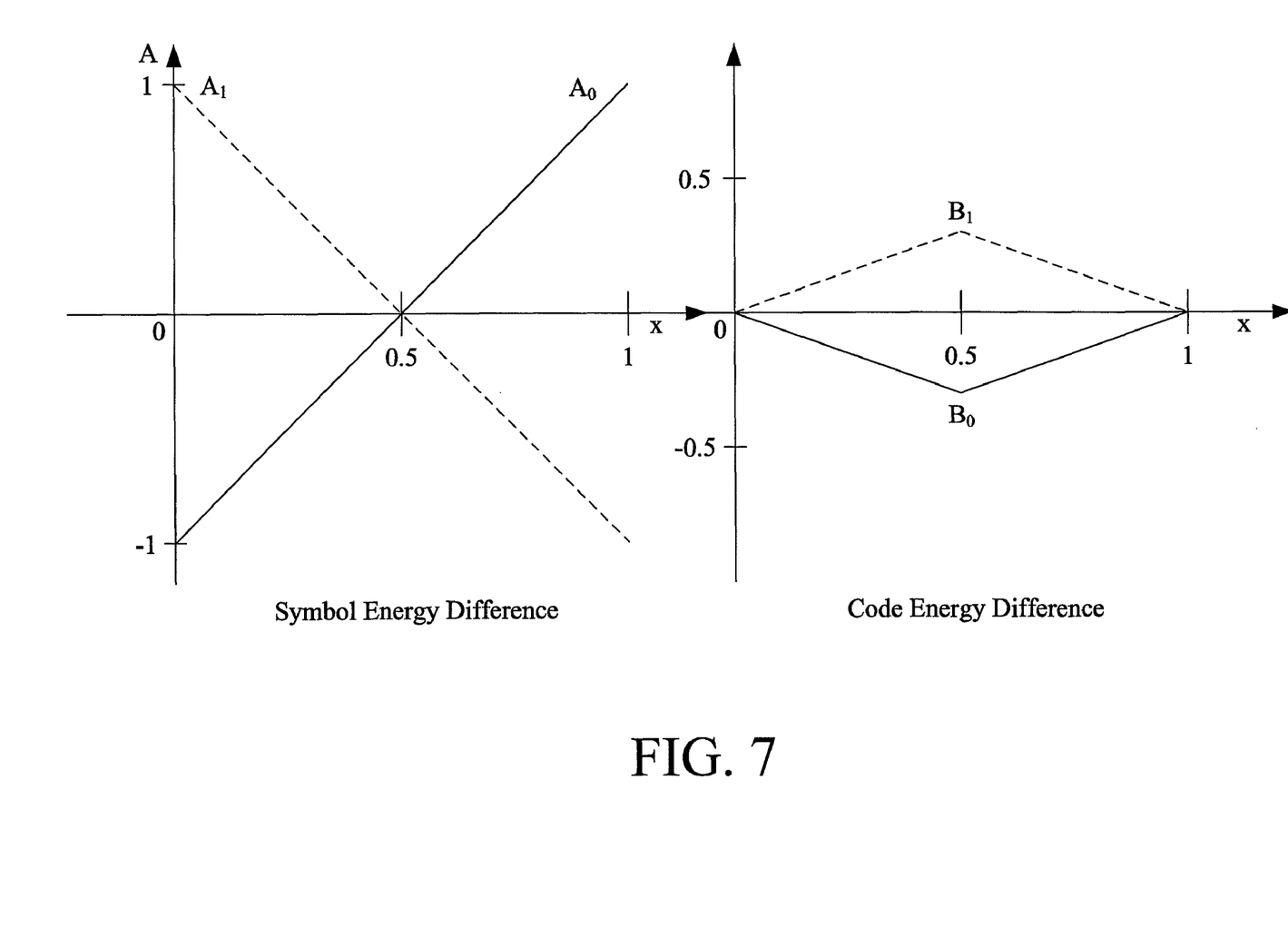
FIG. 7 shows how the measured symbol energy and code energy differences change with the symbol phase.

FIG. 7 shows how the measured code and symbol energy differences change with the symbol phase, x, according to Eq. (5) and (9), respectively. The s-detector 250 can use the symbol energy difference to determine s, i.e., according to Eq. (6), if the difference between $A_0$ and $A_1$ is large, which implies that the following inequality $$y \equiv |x-0.5| > y_0 \quad (11)$$

must be satisfied, where the threshold $y_0$ must be large enough. On the other hand, the s-detector 250 can use the code energy difference to determine s, i.e., according to Eq. (10), if the difference between $B_0$ and $B_1$ is large, which implies that the following inequality $$y \equiv |x-0.5| < y_0 \quad (12)$$

must be satisfied. It is obvious that the optimum detection strategy of the s-detector 250 depends on the symbol phase, x. The detector 250 can use the symbol phase to determine whether the code energy difference B or symbol energy difference A can be used to determine s so that the detection probability (or false alarm probability) of the symbol synchronization will be maximized (or minimized).

Figure 8:
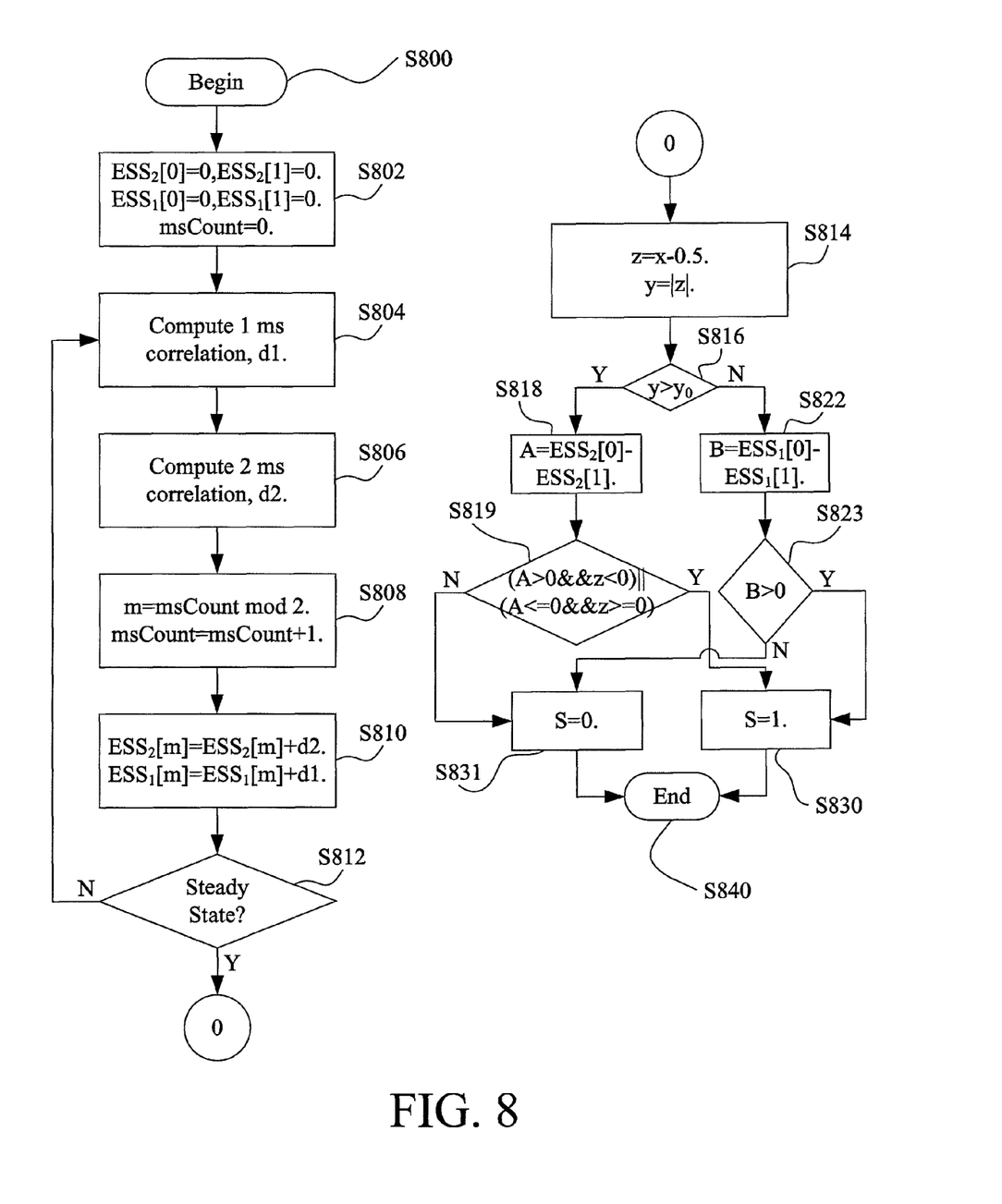
FIG. 8 is a flow chart of a method in accordance with a third embodiment of the present invention, in which code and symbol energy differences are used to determine the position of the symbol edge.

FIG. 8 shows a flow chart of a method in accordance with a third embodiment of the present invention that the symbol synchronizer 200 uses code and symbol energy differences dynamically to determine the position of the symbol edge. The process starts in step S800. The symbol and code energies are initialized (step S802). That is, at msCount=0, $ESS_2[0]=0$ and $ESS_2[1]=0$, in addition, $ESS_1[0]=0$ and $ESS_1[1]=0$. In steps S804 and S806, the 1 ms and 2 ms correlator outputs d1 and d2 are calculated. As described previously, d2 can be calculated as d2=d1+delay of d1. In step S808, the count msCount is increased. In step S810, the 2 ms and 1 ms correlation dumps d2 and d1 are respectively added to the symbol energy and code energy $ESS_2[m]$ and $ESS_1[m]$ (m=0 or 1) to be accumulated. In step S812, it is checked whether a steady state is achieved. That is, it is determined whether the symbol and code energies have been accumulated with sufficient correlation dumps. When the steady state is achieved, the process enters into symbol edge determination stage. In step S814, deviation of symbol phase x is calculated as z=x−0.5, and y=|z|. As described above, the symbol phase x is known. In step S816, it is determined whether the symbol phase x is out of the ambiguity range by comparing y and a predetermined $y_0$ to see whether y is greater than $y_0$. If y is greater than $y_0$, it means that the symbol phase x is out of the ambiguity range, then the following s determination uses symbol energy approach, the process goes to step S818. In step S818, Eq. (5) is used to compute symbol energy difference A. In step S819, Eq. (6) is used to determine s. If A>0 and z<0, alternatively, A≦0 and z≧0, then s is determined to be 1 (step S830). Otherwise, s=0 (step S831). If y is not greater than $y_0$, it means that the symbol phase x is within the ambiguity range. When the symbol phase x is within the ambiguity range, that is, the condition y>$y_0$ is not satisfied, the process determines s by using code energy approach. In step S822, Eq. (9) is used to calculated code energy difference B. Then, Eq. (10) is used to determine s by checking the code energy difference B. In step S823, it is checked if B>0. If B>0, the determination s=1 is selected (step S830). Otherwise, the determination s=0 is selected. (step S831). The process ends in step S840.

Because of the satellite motion with respect to the receiver and the receiver clock bias and drift, the symbol phase, x, which is the transmitted symbol edge with respect to the receiver ms interrupt time point, will change with time. The performance of the symbol synchronizer 200 of FIG. 4 will be affected in this dynamic situation. For an extreme example, if the symbol phase x changes with time according to the following equation:

$$x(t) = \frac{t}{T}, \text{ for } 0 < t < T \quad (13)$$

where T is the measuring time before the symbol synchronizer 200 can determine the position of the symbol edge, then the symbol energies which are used by the symbol synchronizer 200 are useless as shown below. If the symbol edge condition is s=1, then $$E\{SS_2[0]\} = \frac{1}{T}\int_0^T (2-x)dt = \frac{1}{T}\int_0^T \left(2 - \frac{t}{T}\right)dt = \frac{3}{2} \quad (14)$$

$$E\{SS_1[0]\} = \frac{1}{T}\int_0^T (1+x)dt = \frac{1}{T}\int_0^T \left(1 - \frac{t}{T}\right)dt = \frac{3}{2}$$

Therefore the measured symbol energies are identical and cannot provide any information about the position of the symbol edge.

Figure 9:
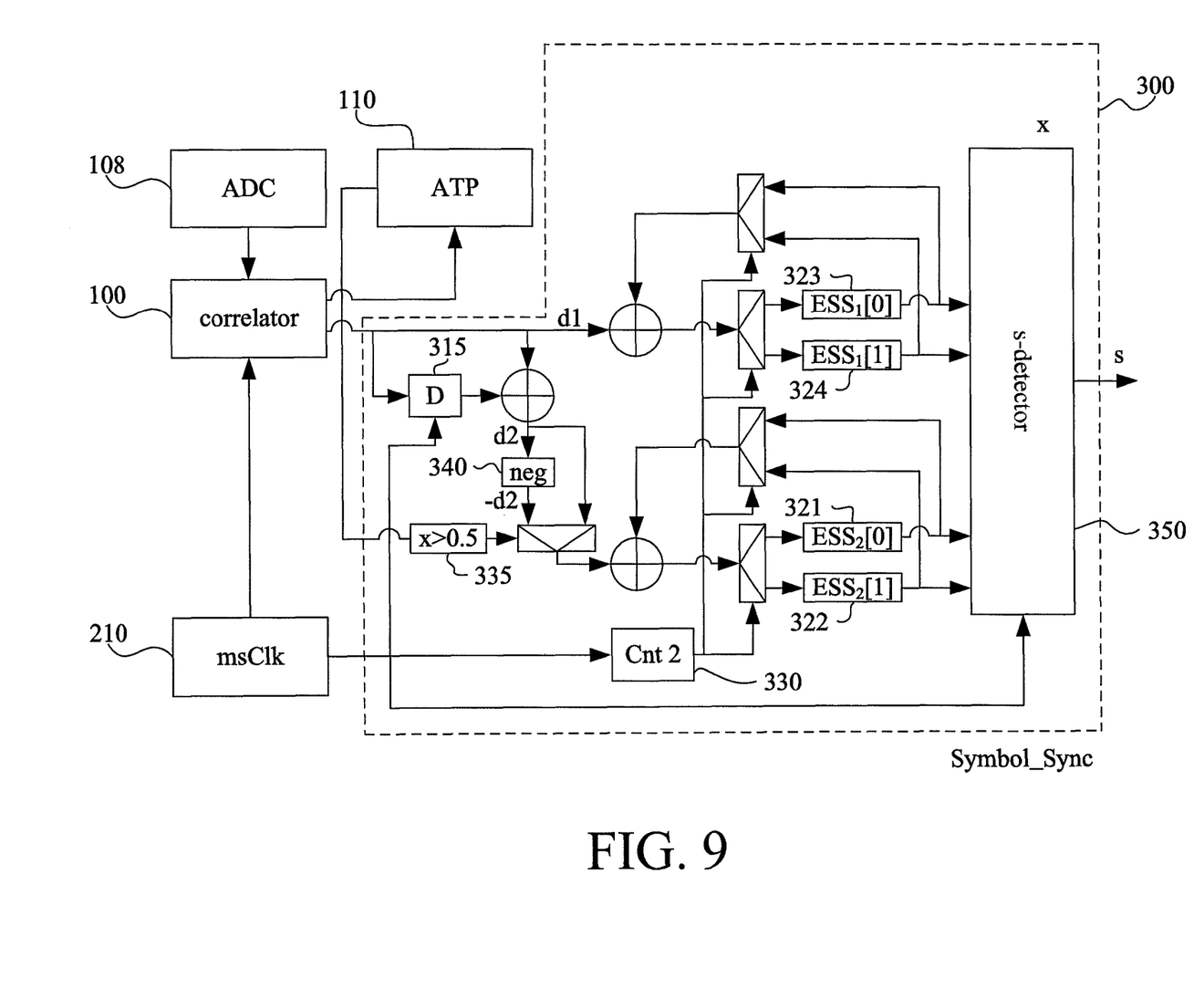
FIG. 9 is a block diagram of a symbol synchronizer of another embodiment in accordance with the present invention, the symbol synchronizer of this embodiment uses the estimated code phase to modify the correlator output before accumulating and then determine the symbol leading edge position.

FIG. 9 shows a symbol synchronizer 300 in accordance with another embodiment of the present invention, which is modified from the symbol synchronizer 200 of FIG. 4 to improve the performance of the symbol synchronization under dynamic condition. The symbol synchronizer 300 of FIG. 9 is generally similar to the symbol synchronizer 200 of FIG. 4, and the like reference numbers indicate the corresponding components. The symbol synchronizer 300 comprises a delay block 315, registers 321, 322, 323, 324 for storing symbol and code energies $ESS_2[0], ESS_2[1], ESS_1[0]$ and $ESS_1[1]$, respectively. The synchronizer 300 also has a counter Cnt 2 330. Referring to FIG. 4 and FIG. 9, the main difference between the symbol synchronizers 200 and 300 is that the synchronizer 300 further comprises a symbol phase checking block 335 checking whether x>0.5 (or x≧0.5). If the symbol phase checking block 335 determines that x>(or ≧) 0.5, the 2 ms correlation d2 is inverted by a negation block 340. More specifically, the measured symbol energy is modified before accumulating as:

$$d2 = -d2 \text{ if } x > 0.5 \quad (15)$$

Figure 10:
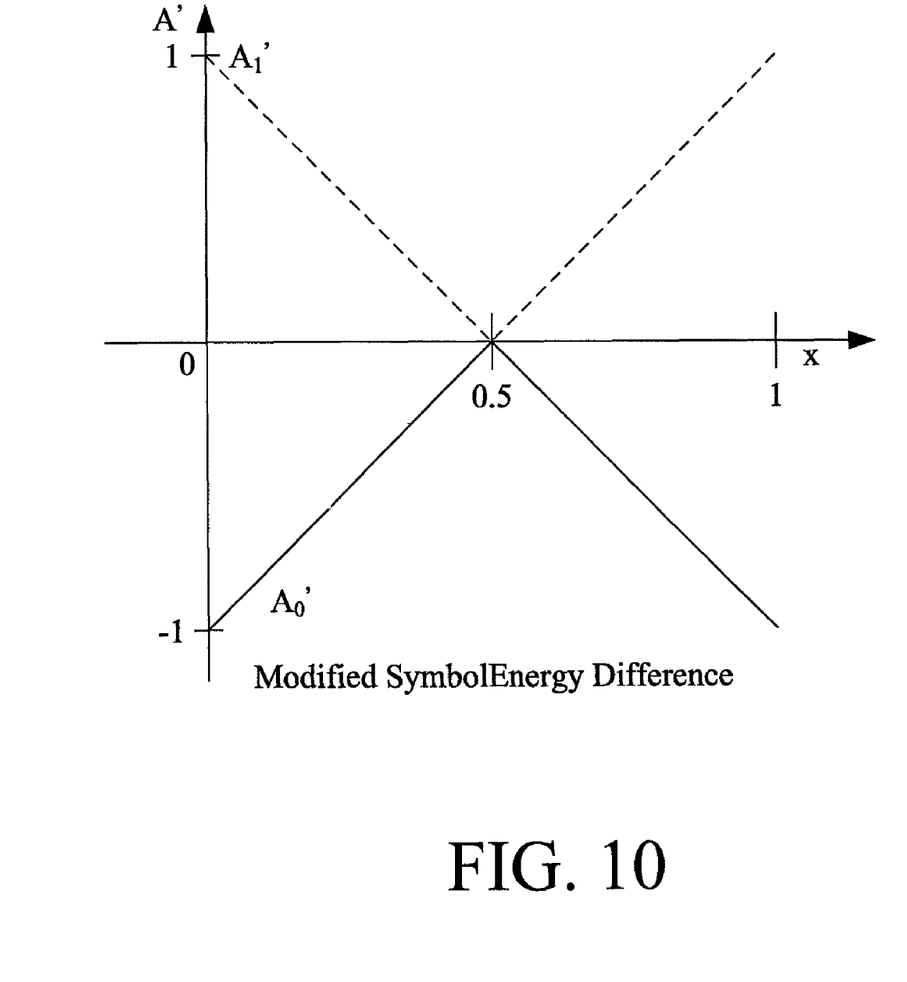
FIG. 10 shows how the modified symbol energy difference changes with the symbol phase.

Then the modified symbol energy difference A' used in an s-detector 350 is:

$$A' \equiv ESS_2[0] - ESS_2[1] = \begin{cases} A_1 & \text{if } s=1 \text{ and } x < 0.5 \\ -A_1 & \text{if } s=1 \text{ and } x \geq 0.5 \\ A_0 & \text{if } s=0 \text{ and } x < 0.5 \\ -A_0 & \text{if } s=0 \text{ and } x \geq 0.5 \end{cases} \quad (16)$$

where $A_0$ and $A_1$ are defined in Eq. (5). FIG. 10 shows that how A' changes with the symbol phase, x, which is a function of time. It is noted that the modified symbol energy difference A' is always non-negative (or non-positive) when s=1 (or s=0). For any symbol phase value, x, the s-detector can determine s based on the modified symbol energy difference, A', as follows $$s = \begin{cases} 1 & \text{if } A' > 0 \\ 0 & \text{if } A' \leq 0 \end{cases} \quad (17)$$

Eq. (17) can be used even for the extreme dynamic condition when the symbol phase x changes with time according to Eq. (13). For example, if s=1 we have $$A' = \frac{1}{T}\int_0^{T/2} A_1 \, dt - \frac{1}{T}\int_{T/2}^T A_1 \, dt = \quad (18)$$

$$\frac{1}{T}\int_0^{T/2}(1-2x)\,dt - \frac{1}{T}\int_{T/2}^T(1-2x)\,dt = \frac{1}{2}$$

And it can be verified that A'=−½ if s=0.

Figure 11:
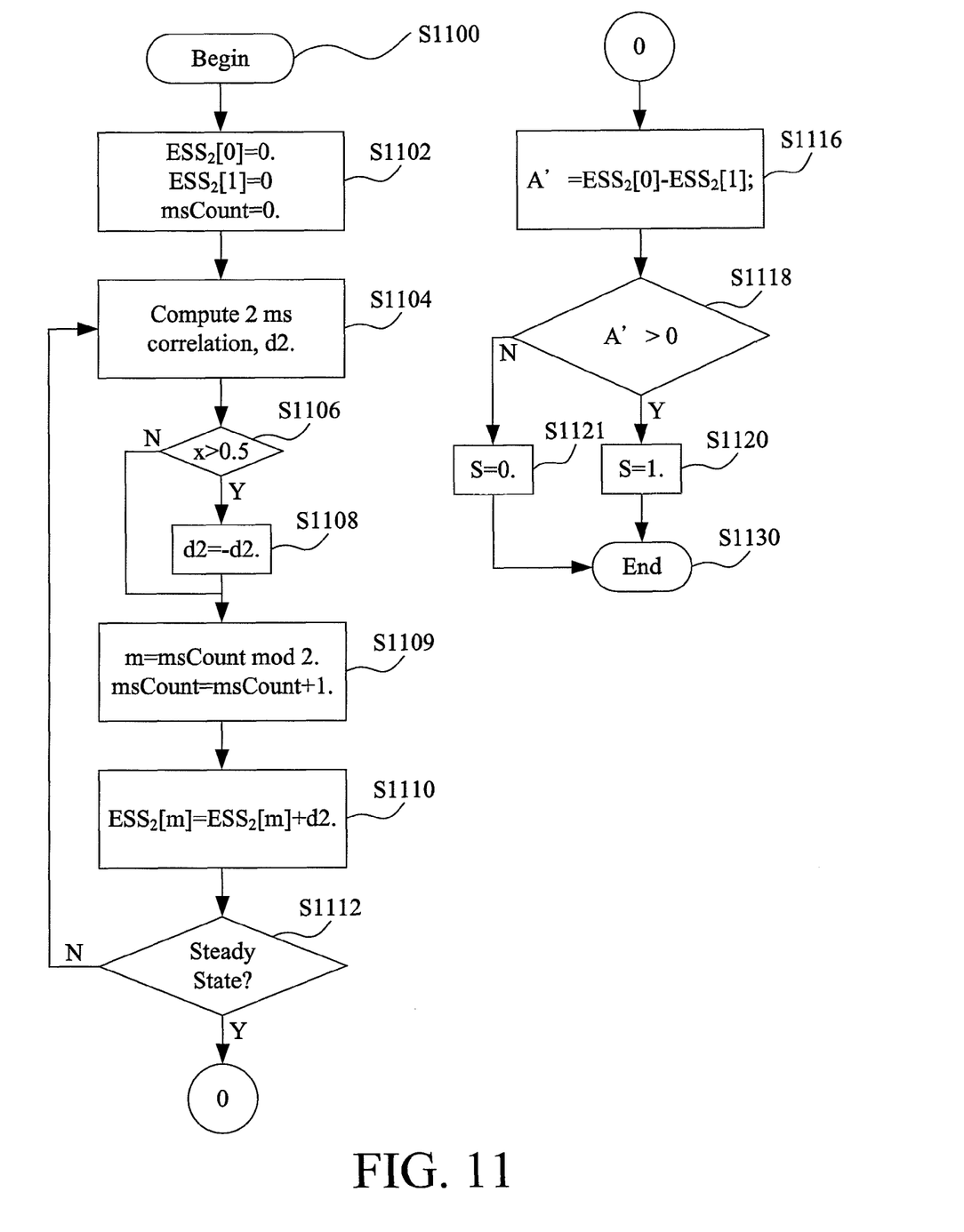
FIG. 11 is a flow chart of a method for determining information element boundary in accordance with a fourth embodiment of the present invention, in which a modified symbol energy difference is used to determine the position of the symbol edge.

FIG. 11 is a flow chart of a method in accordance with a fourth embodiment of the present invention that the symbol synchronizer 300 uses the modified symbol energy difference to determine the position of the symbol edge. As shown, the process starts in step S1100. In step S1102, the symbol energy is initialized. That is, at msCount=0, $ESS_2[0]$=0 and $ESS_2[1]$=0. In step S1104, the 2 ms correlation d2 is computed. As mentioned previously, 1 ms correlation d1 can be computed first, and d2 can be calculated as d2=d1+delay of d1. Then, the symbol phase checking block 335 checks the symbol phase x to determine whether x is greater than 0.5 in step S1106. If so, the correlation d2 should be reversed by the negation block 340, that is, d2=−d2 (step S1108). Then, in step S1109, the count msCount is updated. In step S1110, the 2 ms correlation d2 is added to the symbol energy $ESS_2[m]$. In step S1112, it is determined whether a steady state is achieved. If the steady state is achieved, the process enters symbol edge determination stage, that is, the process goes to step S1116. If not, the process returned to step S1104. In step S1116, the modified symbol energy difference A' is computed (Eq. (16)). In step S1118, the s-detector 350 checks if A'>0. If so, the determination s=1 is selected (step S1120). Otherwise, the determination s=0 is selected. (step S1121). The process ends in step S1130.

It is noted that the code energy based symbol synchronization is still valid when the symbol phase x changes with time. That is, Eq. (10) is still useful even when x is a function of time and satisfies Eq. (13). Therefore, we can use both the code energy and modified symbol energy together to improve the performance. If we define the combined code and modified symbol energy difference as $$C \equiv A'-B = (ESS_2[0]+ESS_1[0])-(ESS_2[1]+ESS_1[1]) \quad (19)$$

then it follows from Eq. (9) and (16) that $$s = \begin{cases} 1, & \text{if } C > 0 \\ 0, & \text{if } C \leq 0 \end{cases} \quad (20)$$

Figure 12:
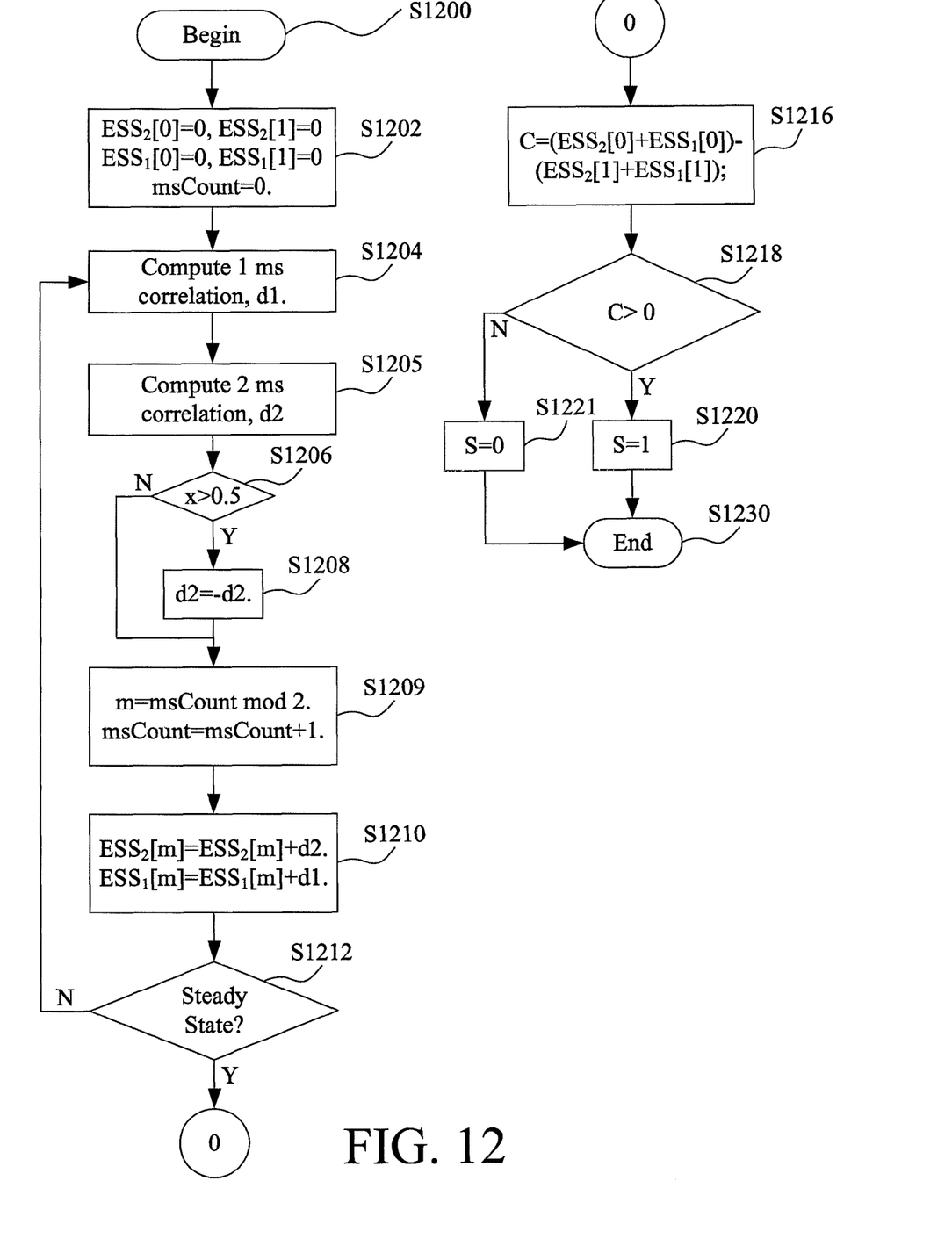
FIG. 12 is a flow chart of a method for determining information element boundary in accordance with a fifth embodiment of the present invention, in which code energy and modified symbol energy differences are used together to determine the position of the symbol edge.

FIG. 12 is a flow chart showing a method of a fifth embodiment of the present invention that the symbol synchronizer 300 uses the code energy and modified symbol energy differences together to determine the position of the symbol edge. The process starts in step S1200. Firstly, the symbol energy and code energy are initialized. That is, at msCount=0, $ESS_2$[0]=0, $ESS_2$[1]=0, and $ESS_1$[0]=0, $ESS_1$[1]=0. In steps S1204 and S1205, the 1 ms and 2 ms correlations d1 and d2 are computed. Then, in step S1206, the symbol phase x is checked to determine whether x is greater than 0.5. If so, the 2 ms correlation of symbol energy approach should be reversed by the negation block 340, that is, d2=−d2 (step S1208). In step S1209, the count msCount is updated. Then the correlation dumps d2 and d1 are respectively added to $ESS_2[m]$ and $ESS_1[m]$ (m=0 or 1) in step S1210 so as to accumulate the symbol energy and code energy. In step S1112, it is checked whether a steady state is achieved. When the steady state is achieved, the process enters symbol edge determination stage. That is, the process goes to step S1216. Otherwise, the process returns to step S1204. In step S1216, the combined energy difference C is computed (Eq. (19)). The s-detector 350 checks if C>0 in step S1218. If so, the s-detector 350 selects the determination s=1 (step S1220). Otherwise, the determination s=0 is selected (step S1221). The process ends in step S1230.

While the preferred embodiments of the present invention have been illustrated and described in detail, various modifications and alternations can be made by persons skilled in this art. The embodiment of the present invention is therefore described in an illustrative but not restrictive sense. It is intended that the present invention should not be limited to the particular forms as illustrated, and that all modifications and alternations which maintain the spirit and realm of the present invention are within the scope as defined in the appended claims.

What is claimed is:

1. A method for determining information element boundary of a signal, the signal having a plurality of information elements, each information element consisting of a group of codes, said method comprising steps of:
   obtaining a symbol phase of the signal;
   calculating energies of the signal over a predetermined duration for a plurality of a first group of time units and dumping the energies into a first energy value;
   calculating energies of the signal over the predetermined duration for the plurality of a second group of time units and dumping the energies into a second energy value;
   comparing the first and second energy values; and
   determining which of the first and second groups of time units the information element boundary is in according to the comparing result of the first and second energy values and the symbol phase.

2. The method of claim 1, wherein the predetermined duration is a period of the information element.

3. The method of claim 2, wherein the information element boundary is determined according to the comparing result of the first and second energy values and whether the symbol phase is greater than a predetermined value.

4. The method of claim 3, wherein the energies of the signal for the plurality of first and second groups of time units are respectively dumped into the first and second energy values based on a first function of the symbol phase when the symbol phase is not greater than the predetermined value, while based on a second function of the symbol phase when the symbol phase is greater than the predetermined value.

5. The method of claim 4, wherein the second function is an inverse of the first function.

6. The method of claim 3, wherein the predetermined value is the middle value of one time unit.

7. The method of claim 1, wherein the predetermined duration is a period of a code.

8. The method of claim 1, wherein the first group of time units are odd time units and the second group of time units are even time units.

9. The method of claim 1, wherein one time unit is one code period.

10. The method of claim 1, further comprising a step of determining a beginning time point of correlation according to the symbol phase after determining which of the first and second groups of time units the information element boundary is in.

11. A method for determining information element boundary of a signal, the signal having a plurality of information elements, each information element consisting of a group of codes, said method comprising steps of:
obtaining a symbol phase of the signal;
calculating energies of the signal over a first duration for a plurality of a first group of time units and dumping the energies into a first energy value;
calculating energies of the signal over the first duration for the plurality of a second group of time units and dumping the energies into a second energy value;
calculating energies of the signal over a second duration for the plurality of the first group of time units and dumping the energies into a third energy value;
calculating energies of the signal over the second duration for the plurality of the second group of time units and dumping the energies into a fourth energy value; and
determining which of the first and second groups of time units the information element boundary is in according to the energy values and the symbol phase.

12. The method of claim 11, wherein the first duration is a period of one information element.

13. The method of claim 11, wherein the second duration is a period of one code.

14. The method of claim 11, further comprising selecting to compare the first and second energy values or to compare the third and fourth energy values to determine the information element boundary according to the symbol phase.

15. The method of claim 14, wherein the comparing step is selected depending on whether the symbol phase is within a predetermined range.

16. The method of claim 11, further comprising comparing the first and second energy values and comparing the third and fourth energy values, the information element boundary is determined according to the comparing results and the symbol phase.

17. The method of claim 16, wherein the information element boundary is determined according the comparing results and whether the symbol phase is greater than a predetermined value.

18. The method of claim 17, wherein the predetermined value is the middle value of one time unit.

19. The method of claim 11, wherein the first duration is one information element period.

20. The method of claim 11, wherein the second duration is one code period.

21. The method of claim 11, wherein the first group of time units are odd time units and the second group of time units are even time units.

22. The method of claim 11, wherein one time unit is one code period.

23. The method of claim 12, further comprising a step of determining a beginning time point of correlation according to the symbol phase after determining which of the first and second groups of time units the information element boundary is in.

24. A synchronizer for determining information element boundary of a signal, the signal having a plurality of information elements, each information element consisting of a group of codes, said synchronizer comprising:
a first register accumulating correlations of the signal over a first duration for a plurality of a first group of time units as a first energy value;
a second register accumulating correlations of the signal over the first duration for the plurality of a second group of time units as a second energy value; and
a detector comparing the first and second energy values to determine which of the first and second groups of time units the information element boundary is in according to the comparing result of the first and second energy values and a symbol phase of the signal.

25. The synchronizer of claim 24, wherein the first duration is a period of the information element.

26. The synchronizer of claim 24, further comprising a symbol phase checking block checking if the symbol phase is greater than a predetermined value, the detector determines the information element boundary according to the comparing result of the first and second energy values and checking result for the symbol phase.

27. The synchronizer of claim 26, further comprising a negation block for inverting the correlation when symbol phase checking block determines that the symbol phase is greater than the predetermined value.

28. The synchronizer of claim 26, wherein the predetermined value is the middle value of one time unit.

29. The synchronizer of claim 24, wherein the first duration is a period of the code.

30. The synchronizer of claim 24, wherein the first group of time units are odd time units and the second group of time units are even time units.

31. The synchronizer of claim 24, wherein one time unit is one code period.

32. The synchronizer of claim 24, further comprising:
a third register accumulating correlations of the signal over a second duration for a plurality of the first group of time units as a third energy value; and
a fourth register accumulating correlations of the signal over the second duration for the plurality of the second group of time units as a fourth energy value,
the detector determine which of the first and second groups of time units the information element boundary is in according to the first, second, third and fourth energy values.

33. The synchronizer of claim 32, wherein the detector selects to compare the first and second energy values or compare the third and fourth energy values according to the symbol phase, and determines the information element boundary according to the comparing result.

34. The synchronizer of claim 32, wherein the detector combines comparison of the first and second energy values and comparison of the third and fourth energy values and determines the information element boundary according to the combined comparison result.

* * * * *